US011056123B2

(12) United States Patent
Frett et al.

(10) Patent No.: US 11,056,123 B2
(45) Date of Patent: *Jul. 6, 2021

(54) SYSTEMS AND METHODS TO IMPROVE TIMESTAMP TRANSITION RESOLUTION

(71) Applicant: The Nielsen Company (US), LLC, New York, NY (US)

(72) Inventors: Ken Joseph Frett, Tampa, FL (US); Vladimir Kuznetsov, Ellicott City, MD (US); David Gish, Riverdale, NJ (US); Sadhana Gupta, Columbia, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,715

(22) Filed: Jul. 30, 2020

(65) Prior Publication Data
US 2020/0357419 A1 Nov. 12, 2020

Related U.S. Application Data

(63) Continuation of application No. 16/450,057, filed on Jun. 24, 2019, now Pat. No. 10,734,004, which is a (Continued)

(51) Int. Cl.
*G10L 19/018* (2013.01)
*G10L 25/45* (2013.01)
(Continued)

(52) U.S. Cl.
CPC ............ *G10L 19/018* (2013.01); *G10L 25/45* (2013.01); *H04N 21/4302* (2013.01);
(Continued)

(58) Field of Classification Search
CPC ....... G10L 19/08; G10L 25/45; G06T 1/0085; G06T 1/0021; H04N 21/8358
(Continued)

(56) References Cited

U.S. PATENT DOCUMENTS

| 5,428,606 A | 6/1995 | Moskowitz |
| 5,539,735 A | 7/1996 | Moskowitz |

(Continued)

FOREIGN PATENT DOCUMENTS

| JP | 2009-515371 | 4/2009 |
| JP | 2012-134980 | 7/2012 |

(Continued)

OTHER PUBLICATIONS

International Searching Authority, "Search Report," issued in connection with PCT patent application No. PCT/US2018/054657, dated Feb. 12, 2019, 8 pages.
(Continued)

*Primary Examiner* — Melur Ramakrishnaiah
(74) *Attorney, Agent, or Firm* — Hanley, Flight & Zimmerman, LLC

(57) ABSTRACT

Systems, methods, apparatus, and articles of manufacture to improve timestamp transition resolution of watermarks are disclosed. An example system includes a processor to: identify a first transition window between a first watermark detected in media and a second watermark detected in the media; calculate a first number of time units between the first watermark and the second watermark; when the first number of time units is greater than a threshold, set the first transition window as a first reference transition window, and map the first reference transition window forward by a second number of time units; identify a second transition window between the second watermark and a third watermark detected in the media; calculate a third number of time units between the second watermark and the third watermark; when the third number of time units is greater than the threshold, calculate a fourth number of time units included in an overlap between the first reference transition window and the second transition window, and when the fourth (Continued)

number of time units is less than or equal to the threshold, set the overlap between the first reference transition window and the second transition window as an established time transition.

18 Claims, 6 Drawing Sheets

Related U.S. Application Data continuation of application No. 15/800,466, filed on Nov. 1, 2017, now Pat. No. 10,347,262.

(60) Provisional application No. 62/573,798, filed on Oct. 18, 2017.

(51) Int. Cl.
  *H04N 21/8547* (2011.01)
  *H04N 21/8358* (2011.01)
  *H04N 21/43* (2011.01)
  *H04N 19/467* (2014.01)

(52) U.S. Cl.
  CPC ..... *H04N 21/8358* (2013.01); *H04N 21/8547* (2013.01); *H04N 19/467* (2014.11)

(58) Field of Classification Search
  USPC ....... 700/94; 704/205, 273, 500; 725/19, 14; 713/176, 500, 501
  See application file for complete search history.

(56) References Cited

U.S. PATENT DOCUMENTS

| | | | |
|---|---|---|---|
| 5,613,004 A | 3/1997 | Cooperman et al. | |
| 5,687,236 A | 11/1997 | Moskowitz et al. | |
| 5,745,569 A | 4/1998 | Moskowitz et al. | |
| 5,889,868 A | 3/1999 | Moskowitz et al. | |
| 6,078,664 A | 6/2000 | Moskowitz et al. | |
| 6,205,249 B1 | 3/2001 | Moskowitz | |
| 6,522,767 B1 | 2/2003 | Moskowitz et al. | |
| 6,598,162 B1 | 7/2003 | Moskowitz | |
| 6,853,726 B1 | 2/2005 | Moskowitz et al. | |
| 7,007,166 B1 | 2/2006 | Moskowitz et al. | |
| 7,035,409 B1 | 4/2006 | Moskowitz | |
| 7,095,874 B2 | 8/2006 | Moskowitz et al. | |
| 7,107,451 B2 | 9/2006 | Moskowitz | |
| 7,123,718 B1 | 10/2006 | Moskowitz et al. | |
| 7,127,615 B2 | 10/2006 | Moskowitz | |
| 7,152,162 B2 | 12/2006 | Moskowitz et al. | |
| 7,159,116 B2 | 1/2007 | Moskowitz | |
| 7,177,429 B2 | 2/2007 | Moskowitz et al. | |
| 7,284,130 B2 | 10/2007 | Asano et al. | |
| 7,343,492 B2 | 3/2008 | Moskowitz et al. | |
| 7,346,472 B1 | 3/2008 | Moskowitz et al. | |
| 7,362,775 B1 | 4/2008 | Moskowitz | |
| 7,370,207 B2 | 5/2008 | Asano et al. | |
| 7,380,127 B2 | 5/2008 | Asano et al. | |
| 7,398,397 B2 | 7/2008 | Asano et al. | |
| 7,409,073 B2 | 8/2008 | Moskowitz et al. | |
| 7,421,584 B2 | 9/2008 | Asano et al. | |
| 7,426,640 B2 | 9/2008 | Asano et al. | |
| 7,426,641 B2 | 9/2008 | Asano et al. | |
| 7,428,640 B2 | 9/2008 | Asano et al. | |
| 7,437,564 B2 | 10/2008 | Asano et al. | |
| 7,437,565 B2 | 10/2008 | Asano et al. | |
| 7,451,320 B2 | 11/2008 | Asano et al. | |
| 7,457,962 B2 | 11/2008 | Moskowitz | |
| 7,475,246 B1 | 1/2009 | Moskowitz et al. | |
| 7,532,725 B2 | 5/2009 | Moskowitz et al. | |
| 7,568,100 B1 | 7/2009 | Moskowitz et al. | |
| 7,647,502 B2 | 1/2010 | Moskowitz | |
| 7,647,503 B2 | 1/2010 | Moskowitz | |
| 7,660,700 B2 | 2/2010 | Moskowitz et al. | |
| 7,664,263 B2 | 2/2010 | Moskowitz | |
| 7,664,264 B2 | 2/2010 | Moskowitz et al. | |
| 7,664,958 B2 | 2/2010 | Moskowitz | |
| 7,730,317 B2 | 6/2010 | Moskowitz et al. | |
| 7,738,659 B2 | 6/2010 | Moskowitz | |
| 7,761,712 B2 | 7/2010 | Moskowitz et al. | |
| 7,770,017 B2 | 8/2010 | Moskowitz et al. | |
| 7,779,261 B2 | 8/2010 | Moskowitz et al. | |
| 7,813,506 B2 | 10/2010 | Moskowitz et al. | |
| 7,822,197 B2 | 10/2010 | Moskowitz | |
| 7,827,312 B2 | 11/2010 | Ramaswamy et al. | |
| 7,830,915 B2 | 11/2010 | Moskowitz | |
| 7,844,074 B2 | 11/2010 | Moskowitz et al. | |
| 7,870,393 B2 | 1/2011 | Moskowitz et al. | |
| 7,877,609 B2 | 1/2011 | Moskowitz | |
| 7,913,087 B2 | 3/2011 | Moskowitz | |
| 7,930,545 B2 | 4/2011 | Moskowitz | |
| 7,949,494 B2 | 5/2011 | Moskowitz et al. | |
| 7,953,981 B2 | 5/2011 | Moskowitz | |
| 7,987,371 B2 | 7/2011 | Moskowitz | |
| 7,991,188 B2 | 8/2011 | Moskowitz | |
| 8,046,841 B2 | 10/2011 | Moskowitz et al. | |
| 8,121,343 B2 | 2/2012 | Moskowitz et al. | |
| 8,160,249 B2 | 4/2012 | Moskowitz et al. | |
| 8,161,286 B2 | 4/2012 | Moskowitz et al. | |
| 8,171,561 B2 | 5/2012 | Moskowitz et al. | |
| 8,175,330 B2 | 5/2012 | Moskowitz et al. | |
| 8,214,175 B2 | 7/2012 | Moskowitz et al. | |
| 8,225,099 B2 | 7/2012 | Moskowitz et al. | |
| 8,238,553 B2 | 8/2012 | Moskowitz et al. | |
| 8,265,276 B2 | 9/2012 | Moskowitz | |
| 8,265,278 B2 | 9/2012 | Moskowitz et al. | |
| 8,271,795 B2 | 9/2012 | Moskowitz | |
| 8,281,140 B2 | 10/2012 | Moskowitz | |
| 8,307,213 B2 | 11/2012 | Moskowitz et al. | |
| 8,467,525 B2 | 6/2013 | Moskowitz et al. | |
| 8,554,545 B2 | 8/2013 | Srinivasan et al. | |
| 8,526,611 B2 | 9/2013 | Moskowitz et al. | |
| 8,538,011 B2 | 9/2013 | Moskowitz | |
| 8,542,831 B2 | 9/2013 | Moskowitz | |
| 8,549,305 B2 | 10/2013 | Moskowitz et al. | |
| 8,601,163 B2 | 12/2013 | Ramaswamy et al. | |
| 8,612,765 B2 | 12/2013 | Moskowitz | |
| 8,712,728 B2 | 4/2014 | Moskowitz et al. | |
| 8,739,295 B2 | 5/2014 | Moskowitz et al. | |
| 8,767,962 B2 | 7/2014 | Moskowitz et al. | |
| 8,774,216 B2 | 7/2014 | Moskowitz | |
| 8,781,121 B2 | 7/2014 | Moskowitz et al. | |
| 8,789,201 B2 | 7/2014 | Moskowitz et al. | |
| 8,798,268 B2 | 8/2014 | Moskowitz et al. | |
| 8,930,719 B2 | 1/2015 | Moskowitz | |
| 9,021,602 B2 | 4/2015 | Moskowitz | |
| 9,070,151 B2 | 6/2015 | Moskowitz | |
| 9,104,842 B2 | 8/2015 | Moskowitz | |
| 9,171,136 B2 | 10/2015 | Moskowitz | |
| 9,191,205 B2 | 11/2015 | Moskowitz | |
| 9,191,206 B2 | 11/2015 | Moskowitz | |
| 9,231,980 B2 | 1/2016 | Moskowitz et al. | |
| 9,258,116 B2 | 2/2016 | Moskowitz et al. | |
| 9,270,859 B2 | 2/2016 | Moskowitz et al. | |
| 9,368,123 B2 | 6/2016 | Srinivasan et al. | |
| 9,418,385 B1 | 8/2016 | Wang et al. | |
| 9,514,505 B2 | 12/2016 | Maas et al. | |
| 9,602,891 B2 | 3/2017 | Winograd et al. | |
| 9,609,034 B2 | 3/2017 | Ramaswamy et al. | |
| 9,710,669 B2 | 7/2017 | Moskowitz et al. | |
| 9,769,543 B2 | 9/2017 | Petrovic et al. | |
| 9,805,436 B2 | 10/2017 | Maas et al. | |
| 9,830,600 B2 | 11/2017 | Moskowitz | |
| 9,843,445 B2 | 12/2017 | Moskowitz et al. | |
| 9,893,888 B2 | 2/2018 | Moskowitz et al. | |
| 9,900,652 B2 | 2/2018 | Ramaswamy et al. | |
| 9,934,408 B2 | 4/2018 | Moskowitz et al. | |
| 9,942,602 B2 | 4/2018 | Petrovic et al. | |
| 1,073,400 A1 | 4/2020 | Frett et al. | |
| 2001/0010078 A1 | 7/2001 | Moskowitz | |
| 2001/0029580 A1 | 10/2001 | Moskowitz | |
| 2002/0010684 A1 | 1/2002 | Moskowitz | |
| 2002/0056041 A1 | 5/2002 | Moskowitz | |

(56) References Cited

U.S. PATENT DOCUMENTS

| | | |
|---|---|---|
| 2002/0071556 A1 | 6/2002 | Moskowitz et al. |
| 2003/0219143 A1 | 11/2003 | Moskowitz et al. |
| 2004/0086119 A1 | 5/2004 | Moskowitz |
| 2004/0136531 A1 | 7/2004 | Asano et al. |
| 2004/0243540 A1 | 12/2004 | Moskowitz et al. |
| 2005/0135615 A1 | 6/2005 | Moskowitz et al. |
| 2005/0177727 A1 | 8/2005 | Moskowitz et al. |
| 2006/0101269 A1 | 5/2006 | Moskowitz et al. |
| 2006/0140403 A1 | 6/2006 | Moskowitz |
| 2006/0242325 A1 | 10/2006 | Ramaswamy et al. |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0110240 A1 | 5/2007 | Moskowitz et al. |
| 2007/0113094 A1 | 5/2007 | Moskowitz et al. |
| 2007/0217606 A1 | 9/2007 | Asano et al. |
| 2007/0217652 A1 | 9/2007 | Asano et al. |
| 2007/0217653 A1 | 9/2007 | Asano et al. |
| 2007/0223782 A1 | 9/2007 | Asano et al. |
| 2007/0223783 A1 | 9/2007 | Asano et al. |
| 2007/0223784 A1 | 9/2007 | Asano et al. |
| 2007/0223786 A1 | 9/2007 | Asano et al. |
| 2007/0226506 A1 | 9/2007 | Moskowitz |
| 2007/0230696 A1 | 10/2007 | Asano et al. |
| 2007/0230740 A1 | 10/2007 | Asano et al. |
| 2007/0230741 A1 | 10/2007 | Asano et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz et al. |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0217052 A1* | 8/2009 | Baudry ............... G06T 1/0085 713/178 |
| 2009/0220074 A1 | 9/2009 | Moskowitz et al. |
| 2010/0002904 A1 | 1/2010 | Moskowitz et al. |
| 2010/0005308 A1 | 1/2010 | Moskowitz |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz et al. |
| 2010/0153734 A1 | 6/2010 | Moskowitz et al. |
| 2010/0202607 A1 | 8/2010 | Moskowitz et al. |
| 2010/0220861 A1 | 9/2010 | Moskowitz |
| 2010/0293387 A1 | 11/2010 | Moskowitz et al. |
| 2010/0313033 A1 | 12/2010 | Moskowitz et al. |
| 2011/0010555 A1 | 1/2011 | Moskowitz et al. |
| 2011/0016231 A1 | 1/2011 | Ramaswamy et al. |
| 2011/0019691 A1 | 1/2011 | Moskowitz |
| 2011/0026709 A1 | 2/2011 | Moskowitz et al. |
| 2011/0069864 A1 | 3/2011 | Moskowitz et al. |
| 2011/0103639 A1 | 5/2011 | Moskowitz et al. |
| 2011/0179069 A1 | 7/2011 | Moskowitz et al. |
| 2011/0305365 A1 | 12/2011 | Moskowitz et al. |
| 2012/0207303 A1 | 8/2012 | Moskowitz et al. |
| 2012/0209955 A1 | 8/2012 | Moskowitz et al. |
| 2012/0239686 A1 | 9/2012 | Moskowitz et al. |
| 2012/0278627 A1 | 11/2012 | Moskowitz |
| 2012/0300928 A1 | 11/2012 | Moskowitz et al. |
| 2013/0014271 A1 | 1/2013 | Moskowitz |
| 2013/0185397 A1 | 7/2013 | Moskowitz et al. |
| 2013/0188823 A1 | 7/2013 | Moskowitz et al. |
| 2013/0195265 A1 | 8/2013 | Moskowitz |
| 2013/0195270 A1 | 8/2013 | Moskowitz et al. |
| 2013/0198037 A1 | 8/2013 | Moskowitz |
| 2013/0198083 A1 | 8/2013 | Moskowitz |
| 2013/0204899 A1 | 8/2013 | Moskowitz et al. |
| 2013/0205406 A1 | 8/2013 | Moskowitz |
| 2013/0294641 A1 | 11/2013 | Moskowitz |
| 2014/0082220 A1 | 3/2014 | Ramaswamy et al. |
| 2014/0095112 A1 | 4/2014 | Moskowitz et al. |
| 2014/0226811 A1 | 8/2014 | Moskowitz |
| 2014/0226812 A1 | 8/2014 | Moskowitz |
| 2014/0233730 A1 | 8/2014 | Moskowitz |
| 2014/0241524 A1 | 8/2014 | Moskowitz et al. |
| 2014/0270340 A1 | 9/2014 | Maas et al. |
| 2014/0282858 A1 | 9/2014 | Moskowitz et al. |
| 2014/0369500 A1 | 12/2014 | Moskowitz et al. |
| 2015/0074817 A1 | 3/2015 | Moskowitz |
| 2015/0193770 A1 | 7/2015 | Moskowitz |
| 2015/0261639 A1 | 9/2015 | Moskowitz et al. |
| 2016/0004875 A1 | 1/2016 | Moskowitz |
| 2016/0142207 A1 | 5/2016 | Moskowitz et al. |
| 2016/0148334 A1 | 5/2016 | Petrovic et al. |
| 2016/0149701 A1 | 5/2016 | Moskowitz et al. |
| 2016/0150297 A1 | 5/2016 | Petrovic et al. |
| 2016/0182973 A1 | 6/2016 | Winograd et al. |
| 2016/0196447 A1 | 7/2016 | Moskowitz et al. |
| 2016/0353124 A1 | 12/2016 | Gish et al. |
| 2017/0048566 A1* | 2/2017 | Srinivasan ......... H04N 21/8547 |
| 2017/0195716 A1 | 7/2017 | Ramaswamy et al. |
| 2017/0228848 A1* | 8/2017 | Gish ................. H04N 21/4394 |
| 2017/0236240 A1 | 8/2017 | Maas et al. |
| 2017/0243205 A1 | 8/2017 | Moskowitz |
| 2017/0251282 A1 | 8/2017 | Winograd et al. |
| 2017/0262652 A1 | 9/2017 | Moskowitz et al. |
| 2017/0286955 A1 | 10/2017 | Moskowitz |
| 2017/0294206 A1 | 10/2017 | Moskowitz et al. |
| 2017/0374434 A1 | 12/2017 | Petrovic et al. |
| 2018/0109382 A1 | 4/2018 | Moskowitz et al. |
| 2019/0115034 A1 | 4/2019 | Frett et al. |

FOREIGN PATENT DOCUMENTS

| | | |
|---|---|---|
| JP | 2015-534294 | 11/2015 |
| WO | 2016109436 | 7/2016 |

OTHER PUBLICATIONS

International Searching Authority, "Written Opinion," issued in connection with PCT patent application No. PCT/US2018/054657, dated Feb. 12, 2019, 5 pages.

United States Patent and Trademark Office, "Notice of Allowability," issued in connection with U.S. Appl. No. 15/800,466, dated Apr. 17, 2019, 5 pages.

United States Patent and Trademark Office, "Notice of Allowance and Fee(s) Due," issued in connection with U.S. Appl. No. 15/800,466, dated Mar. 1, 2019, 25 pages.

United States Patent and Trademark Office, "Corrected Notice of Allowability," issued in connection with U.S. Appl. No. 16/450,057, dated May 27, 2020, 3 pages.

United States Patent and Trademark Office, "Notice of Allowance," issued in connection with U.S. Appl. No. 16/450,057, dated Mar. 25, 2020, 14 pages.

United States Patent and Trademark Office, "Non-Final Office action," issued in connection with U.S. Appl. No. 16/450,057, dated Nov. 1, 2019, 9 pages.

International Bureau, "International Preliminary Report on Patentability," issued in connection with PCT patent application No. PCT/US2018/054657, dated Feb. 12, 2019, 6 pages.

Japanese Patent Office, "Notice of Reasons for Rejection," mailed in connection with Japanese Patent Application No. 2020-520794, dated Apr. 6, 2021, 6 pages.

Ramona et al. "Audioprint: An Efficient Audio Fingerprint System Based on a Novel Cost-less Synchronization Scheme," IEEE International Conference on Acoustics, Speech and Signal Processing, May 26, 2013, 5 pages. (online version downloaded from https://

(56) References Cited

OTHER PUBLICATIONS www.researchgate.net/publication/261153430_Audioprint_An_Efficient_Audio_Fingerprint_System_Based_On_A_Novel_Cost-Less_Synchronization_Scheme).

* cited by examiner

_US 11,056,123 B2_

SYSTEMS AND METHODS TO IMPROVE TIMESTAMP TRANSITION RESOLUTION

RELATED APPLICATIONS

This patent arises from a continuation of U.S. patent application Ser. No. 16/450,057, titled "SYSTEMS AND METHODS TO IMPROVE TIMESTAMP TRANSITION RESOLUTION," filed Jun. 24, 2019, which is a continuation of U.S. patent application Ser. No. 15/800,466, titled "SYSTEMS AND METHODS TO IMPROVE TIMESTAMP TRANSITION RESOLUTION," filed Nov. 1, 2017, which claims the benefit under 35 U.S.C. § 119(e) of U.S. Provisional Patent Application Ser. No. 62/573,798, which was filed on Oct. 18, 2017. Priority to U.S. patent application Ser. No. 16/450,057, U.S. patent application Ser. No. 15/800,466, and U.S. Provisional Patent Application Ser. No. 62/573,798 is claimed. U.S. patent application Ser. No. 16/450,057, U.S. patent application Ser. No. 15/800, 466, and U.S. Provisional Patent Application Ser. No. 62/573,798 are hereby incorporated herein by reference in their entireties.

FIELD OF THE DISCLOSURE

This disclosure relates generally to media watermarking, and, more particularly, to systems and methods to improve timestamp transition resolution.

BACKGROUND

Watermarks can be embedded or otherwise included in media to enable additional information to be conveyed with the media. For example, audio watermarks can be embedded or otherwise included in the audio data/signal portion of a media stream, file and/or signal to convey data, such as media identification information, copyright protection information, timestamps indicative of broadcast time, etc., with the media. Such watermarks enable monitoring of the distribution and/or use of media, such as by detecting watermarks present in television broadcasts, radio broadcasts, streamed multimedia, etc., to identify the particular media being presented to viewers, listeners, users, etc. Such information can be valuable to advertisers, content providers, and the like.

Prior media monitoring systems employing watermarks typically include watermark decoders that identify the information contained in the watermarks. Some prior systems identify the timestamps in the watermarks and transitions between timestamps to a relatively coarse resolution, such as a resolution of one minute.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
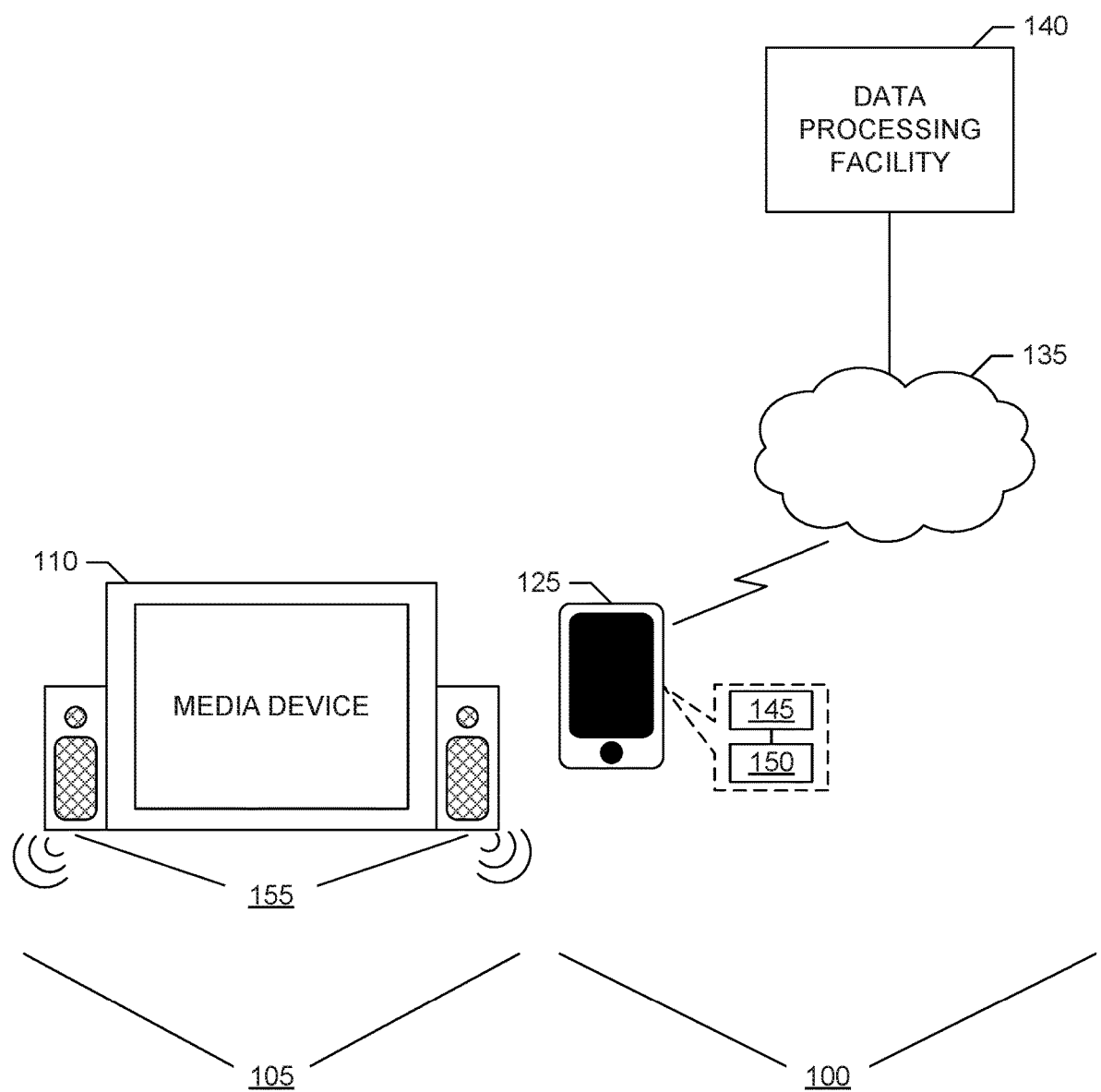
FIG. 1 is a block diagram of an example media monitoring system, which includes an example timestamp transition resolution enhancer constructed in accordance with the teachings of this disclosure.

Systems, methods, apparatus, and articles of manufacture (e.g., non-transitory, physical storage media) to improve timestamp transition resolution in watermarks are disclosed herein. Example watermark timestamp transition resolution enhancing systems include a watermark detector to detect watermarks and a decoder to decode timestamps in respective ones of the watermarks. Some such example systems also include a timestamp transition resolution enhancer to estimate a first transition window indicative of a transition between a first time period to a second time period based on a first one of the timestamps and a second one of the timestamps. In some examples, the timestamp transition resolution enhancer also estimates, when the first transition window does not satisfy a threshold, a second transition window indicative of a transition between the second time period and a third time period based on the second timestamp and a third one of the timestamps. In addition, the example timestamp transition resolution enhancer of some examples determines a first mapped transition window based on an intersection of the first transition window and the second transition window and sets the first mapped transition window as a reference time transition window for subsequent time periods.

In some examples, the timestamp transition resolution enhancer is to set the first transition window as an established time transition when the first transition window satisfies the threshold.

In some examples, the timestamp transition resolution enhancer is to set the first mapped transition window as an established time transition when the first mapped transition window satisfies the threshold.

In some examples, the timestamp transition resolution enhancer is to estimate, when the first mapped transition window does not satisfy the threshold, a third transition window indicative of a transition between the third time period and a fourth time period of time based on the third timestamp and a fourth one of the timestamps. In such examples, the timestamp transition resolution enhancer also is to determine a second mapped transition window based on an intersection of the first mapped transition window and the third transition window and set the second mapped transition window as the reference time transition window.

In some examples, the timestamp transition resolution enhancer is to set the second mapped transition window as an established time transition when the second mapped transition window satisfies the threshold.

In some examples, the timestamp transition resolution enhancer is to set an established time transition based on at least one of the first transition window or the first mapped transition window satisfying the threshold. In such examples, the timestamp transition resolution enhancer also is to retroactively map time transitions in the media signal based on the established time transition.

In some examples, respective ones of the time periods have minute durations and the threshold is about five seconds.

In some examples, the first transition window is identified when a first timestamp in a first watermark is different than a second timestamp in a second watermark.

Also disclosed herein are example methods that include estimating, by executing an instruction with a processor, a first transition window indicative of a transition between a first time period to a second time period based on a first timestamp of a first watermark and a second timestamp of a second watermark. Some such example methods also include estimating, by executing an instruction with a processor when the first transition window does not satisfy a threshold, a second transition window indicative of a transition between the second time period and a third time period based on the second timestamp and a third timestamp. In addition, some example methods include determining, by executing an instruction with a processor, a first mapped transition window based on an intersection of the first transition window and the second transition window and setting the first mapped transition window as the reference time transition window for subsequent time periods.

Some example methods also include setting, by executing an instruction with a processor, the first transition window as an established time transition when the first transition window satisfies the threshold.

Some example methods also include setting, by executing an instruction with a processor, the first mapped transition window as an established time transition when the first mapped transition window satisfies the threshold.

Some example methods also include estimating, by executing an instruction with a processor when the first mapped transition window does not satisfy the threshold, a third transition window indicative of a transition between the third time period and a fourth time period of time based on the third timestamp and a fourth timestamp. Such example methods also include determining, by executing an instruction with a processor, a second mapped transition window based on an intersection of the first mapped transition window and the third transition window and setting the second mapped transition window as the reference time transition window.

Some example methods include setting, by executing an instruction with a processor, the second mapped transition window as an established time transition when the second mapped transition window satisfies the threshold.

Some example methods include setting, by executing an instruction with a processor, an established time transition based on at least one of the first transition window or the first mapped transition window satisfying the threshold. Such example methods also include retroactively mapping, by executing an instruction with a processor, time transitions in the media signal based on the established time transition.

Some example methods also include respective ones of the time periods have minute durations and the threshold is about five seconds.

Some example methods also include comparing, by executing an instruction with a processor, a first timestamp in a first watermark and a second time stamp in a second watermark and identifying, by executing an instruction with a processor, the first transition window when the first timestamp and the second timestamp are different.

Also disclosed herein are non-transitory machine-readable storage media comprising machine-readable instructions which, when executed, cause a machine to at least: estimate a first transition window indicative of a transition between a first time period to a second time period based on a first timestamp of a first watermark and a second timestamp of a second watermark. The example instructions of some such examples also cause the machine to estimate, when the first transition window does not satisfy a threshold, a second transition window indicative of a transition between the second time period and a third time period based on the second timestamp and a third timestamp. In addition, the example instructions of some such examples cause the machine to determine a first mapped transition window based on an intersection of the first transition window and the second transition window and set the first mapped transition window as the reference time transition window for subsequent time periods.

In some examples, the instructions cause the machine to set the first transition window as an established time transition when the first transition window satisfies the threshold.

In some examples, the instructions further cause the machine to set the first mapped transition window as an established time transition when the first mapped transition window satisfies the threshold.

In some examples, the instructions further cause the machine to estimate, when the first mapped transition window does not satisfy the threshold, a third transition window indicative of a transition between the third time period and a fourth time period of time based on the third timestamp and a fourth timestamp. In such examples, the instructions also cause the machine to determine a second mapped transition window based on an intersection of the first mapped transition window and the third transition window and set the second mapped transition window as the reference time transition window.

In some examples, the instructions further cause the machine to set the second mapped transition window as an established time transition when the second mapped transition window satisfies the threshold.

In some examples, the instructions further cause the machine to set an established time transition based on at least one of the first transition window or the first mapped transition window satisfying the threshold and retroactively map time transitions in the media signal based on the established time transition.

In some examples, respective ones of the time periods have minute durations and the threshold is about five seconds.

In some examples, the instructions further cause the machine to identify the first transition window when a first timestamp in a first watermark is different than a second timestamp in a second watermark.

Also disclosed herein are example systems that include means for detecting watermarks and means for decoding timestamps in respective ones of the watermarks. Such example systems also includes means for estimating transition windows by estimating a first transition window indicative of a transition between a first time period to a second time period based on a first one of the timestamps and a second one of the timestamps, and estimating, when the first transition window does not satisfy a threshold, a second transition window indicative of a transition between the second time period and a third time period based on the second timestamp and a third one of the timestamps. Such example systems also include means for determining a first mapped transition window based on an intersection of the first transition window and the second transition window. In addition, such example systems include means for setting the first mapped transition window as a reference time transition window for subsequent time periods.

In some example systems, the means for setting is to set the first transition window as an established time transition when the first transition window satisfies the threshold.

In some example systems, the means for setting is to set the first mapped transition window as an established time transition when the first mapped transition window satisfies the threshold.

In some example systems, when the first mapped transition window does not satisfy the threshold, the means for estimating is to estimate a third transition window indicative of a transition between the third time period and a fourth time period of time based on the third timestamp and a fourth one of the timestamps. In such example systems, the means for determining is to determine a second mapped transition window based on an intersection of the first mapped transition window and the third transition window. In addition, in such examples, the means for setting is to set the second mapped transition window as the reference time transition window.

In some examples systems, the means for setting is to set the second mapped transition window as an established time transition when the second mapped transition window satisfies the threshold.

In some examples systems, the means for setting is to set an established time transition based on at least one of the first transition window or the first mapped transition window satisfying the threshold. In such example systems, the means for setting also is to retroactively map time transitions in the media signal based on the established time transition.

In some examples systems, respective ones of the time periods have minute durations and the threshold is about five seconds.

In some examples systems, the means for estimating is to identify the first transition window when a first timestamp in a first watermark is different than a second timestamp in a second watermark.

Also disclosed herein are systems that include a watermark detector to detect watermarks and a decoder to decode timestamps in respective ones of the watermarks. Some such example systems include a timestamp transition resolution enhancer to determine moments of transition between time periods of media containing the watermarks based on the timestamps by: (a) estimating a coarse transition window between two time periods; (b) mapping a prior transition window estimate to the estimate of (a); (c) narrowing to a fine transition window estimate based on an overlap between the estimate of (a) and (b); (d) comparing the estimate of (c) to a threshold; (e) repeating (a) through (d) for successive time periods using the fine transition window estimate of (c) as the prior transition window estimate of (b) until the fine transition window estimate of (c) satisfies the threshold; and (e) establishing the fine transition window estimate as an established moment of transition between time periods when the estimate of (c) satisfies the threshold.

In some examples, the timestamp transition resolution enhancer is to identify the moments of transition between time periods of the media signal based on the established moment of transition.

In some examples, the time periods correspond to successive minutes of the media signal and the threshold is about five seconds.

Also disclosed herein are methods that include detecting, by executing an instruction with a processor, watermarks and decoding, by executing an instruction with a processor, timestamps in respective ones of the watermarks. Some such example methods also include determining, by executing an instruction with a processor, moments of transition between time periods of media containing the watermarks based on the timestamps by: (a) estimating a coarse transition window between two time periods; (b) mapping a prior transition window estimate to the estimate of (a); (c) narrowing to a fine transition window estimate based on an overlap between the estimate of (a) and (b); (d) comparing the estimate of (c) to a threshold; (e) repeating (a) through (d) for successive time periods using the fine transition window estimate of (c) as the prior transition window estimate of (b) until the fine transition window estimate of (c) satisfies the threshold; and (f) establishing the fine transition window estimate as an established moment of transition between windows when the estimate of (c) satisfies the threshold.

In some examples, the method includes identifying, by executing an instruction with a processor, the moments of transition between time periods of the media signal based on the established moment of transition.

In some examples, the method includes the time periods corresponding to successive minutes of the media signal and the threshold is about five seconds.

Also disclosed herein are non-transitory storage media including machine-readable instructions which, when executed, cause a machine to at least detect watermarks and decode timestamps in respective ones of the watermarks. In some examples, the instructions also cause the machine to determine moments of transition between time periods of media containing the watermarks based on the timestamps by: (a) estimating a coarse transition window between two time periods; (b) mapping a prior transition window estimate to the estimate of (a); (c) narrowing to a fine transition window estimate based on an overlap between the estimate of (a) and (b); (d) comparing the estimate of (c) to a threshold; (e) repeating (a) through (d) for successive time periods using the fine transition window estimate of (c) as the prior transition window estimate of (b) until the fine transition window estimate of (c) satisfies the threshold; and (f) establishing the fine transition window estimate as an established moment of transition between windows when the estimate of (c) satisfies the threshold.

In some examples, the instructions further cause the machine to identify the moments of transition between time periods of the media signal based on the established moment of transition.

In some examples, the time periods correspond to successive minutes of the media signal and the threshold is about five seconds.

Also disclosed herein are example systems that include means for detecting watermarks and means for decoding timestamps in respective ones of the watermarks. Such example systems also include means for determining moments of transition between time periods of media containing the watermarks based on the timestamps by: (a) estimating a coarse transition window between two time periods; (b) mapping a prior transition window estimate to the estimate of (a); (c) narrowing to a fine transition window estimate based on an overlap between the estimate of (a) and (b); (d) comparing the estimate of (c) to a threshold; (e) repeating (a) through (d) for successive time periods using the fine transition window estimate of (c) as the prior transition window estimate of (b) until the fine transition window estimate of (c) satisfies the threshold; and (f)

establishing the fine transition window estimate as an established moment of transition between time periods when the estimate of (c) satisfies the threshold.

In some example systems, the means for determining is to identify the moments of transition between time periods of the media signal based on the established moment of transition.

In some example systems, the time periods correspond to successive minutes of the media signal and the threshold is about five seconds.

These and other example methods, apparatus, systems and articles of manufacture (e.g., physical storage media) to implement improve timestamp transition resolution in watermarks in media are disclosed in greater detail below.

As used herein, the term "media" includes any type of content and/or advertisement delivered via any type of distribution medium. Thus, media includes television programming or advertisements, radio programming or advertisements, movies, web sites, streaming media, etc. Further, media includes audio and/or visual (still or moving) content and/or advertisements.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As noted above, watermarks can be embedded or otherwise included in media to enable additional information to be conveyed with the media. This information can include timestamps that indicate the time at which a portion of the media signal containing the watermark was broadcast. Timestamps are important for advertisers, for example, to verify the broadcast of their content. Timestamps are also important in media monitoring to identify the moments in time an audience member was exposed to particular media.

The timestamps embedded in watermarks change with the time of day and with a given time resolution. Thus, a timestamp at one minute may be T1 and the next minute may be T2 (e.g., T1 plus one minute). Comparing one watermark to the next would indicate when the time switched from T1 to T2. However, at times the watermarks cannot be detected based on, for example, noise obscuring the media signal. Thus, many watermarks go undetected. When two detected timestamps indicate a change in time from T1 to T2 but there are undetected watermarks in between the two watermarks, the analysis will not indicate precisely when the time changed from T1 to T2. Though timestamps that are encoded in watermarks may be accurate to the second, traditional systems only have a time transition window resolution of one minute. That is, known systems can only estimate a time change in increments of one minute.

Examples disclosed herein improve the time transition window resolution. For example, in a media signal in which the timestamp code is repeated every 4.8 seconds, there are twelve to thirteen opportunities to detect the timestamp per minute. As disclosed herein, the resolution of the time transition window estimate is improved to, for example, about five seconds. As used herein, "about" means+/−0.2 seconds. This improvement provides more accurate estimation of broadcast time and more valuable information. For example, some advertisements are included in broadcast slots or spots of less than a minute including, for example, ten-second, fifteen-second, or thirty-second spots. When the timestamp transition resolution is only precise to a minute, the exact timing of a sub-minute long broadcast cannot be determined accurately based on such known watermarks.

Turning to the figures, a block diagram of an example media monitoring system 100 implementing improved timestamp transition resolution from watermarks in media signals as disclosed herein is illustrated in FIG. 1. The example media monitoring system 100 of FIG. 1 supports monitoring of media presented at one or more monitored sites, such as an example monitored site 105 illustrated in FIG. 1. The monitored site 105 includes an example media device 110, which is also referred to herein as a media presentation device 110. Although the example of FIG. 1 illustrates one monitored site 105 and one media device 110, improved timestamp transition resolution from watermarks in media signals as disclosed herein can be implemented in media monitoring systems 100 supporting any number of monitored sites 105 having any number of media devices 110.

The media monitoring system 100 of the illustrated example includes an example media device meter 125 (also referred to as a meter 125, a site meter 125, a site unit 125, a home unit 125, a portable device 125, etc.) to monitor media presented by the media device 110. In the illustrated example, the media monitored by the media device meter 125 can correspond to any type of media presentable by the media device 110. For example, monitored media can correspond to media content, such a television programs, radio programs, movies, Internet video, video-on-demand, etc., as well as commercials, advertisements, etc. In the illustrated example, the media device meter 125 determines metering data including timestamps that may identify and/or be used to identify media presented by the media device and the corresponding times (and, thus, infer media exposure) at the monitored site 105. The media device meter 125 then stores and reports this metering data via an example network 135 to an example data processing facility 140. The data processing facility 140 performs any appropriate post-processing of the metering data to, for example, determine audience ratings information, identify targeted advertising to be provided to the monitored site 105, etc. In the illustrated example, the network 135 can correspond to any type(s) and/or number of wired and/or wireless data networks, or any combination thereof.

In the illustrated example, the media device 110 monitored by the media device meter 125 can correspond to any type of audio, video and/or multimedia presentation device capable of presenting media audibly and/or visually. For example, the media device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As other examples, the media device 110 can correspond to a multimedia computer system, a personal digital assistant, a cellular/mobile smartphone, a radio, a tablet computer, etc.

In the media monitoring system 100 of the illustrated example, the media device meter 125 and the data processing facility 140 cooperate to perform media monitoring based on detected media watermarks. Moreover, the media device meter 125 implements improved timestamp transition resolution as disclosed herein. Examples of watermarks include identification codes, ancillary codes, etc., that may be transmitted within media signals. For example, identification codes can be transmitted as watermarked data embedded or otherwise included with media (e.g., inserted into the audio, video, or metadata stream of media) to uniquely identify broadcasters and/or media (e.g., content or advertisements). Watermarks can additionally or alternatively be used to carry other types of data, such as copyright protection information, secondary data (e.g., such as one or more hyperlinks pointing to secondary media retrievable via the Internet and associated with the primary media carrying the watermark), commands to control one or more devices, etc. Watermarks are typically extracted using a decoding operation.

Figure 3:
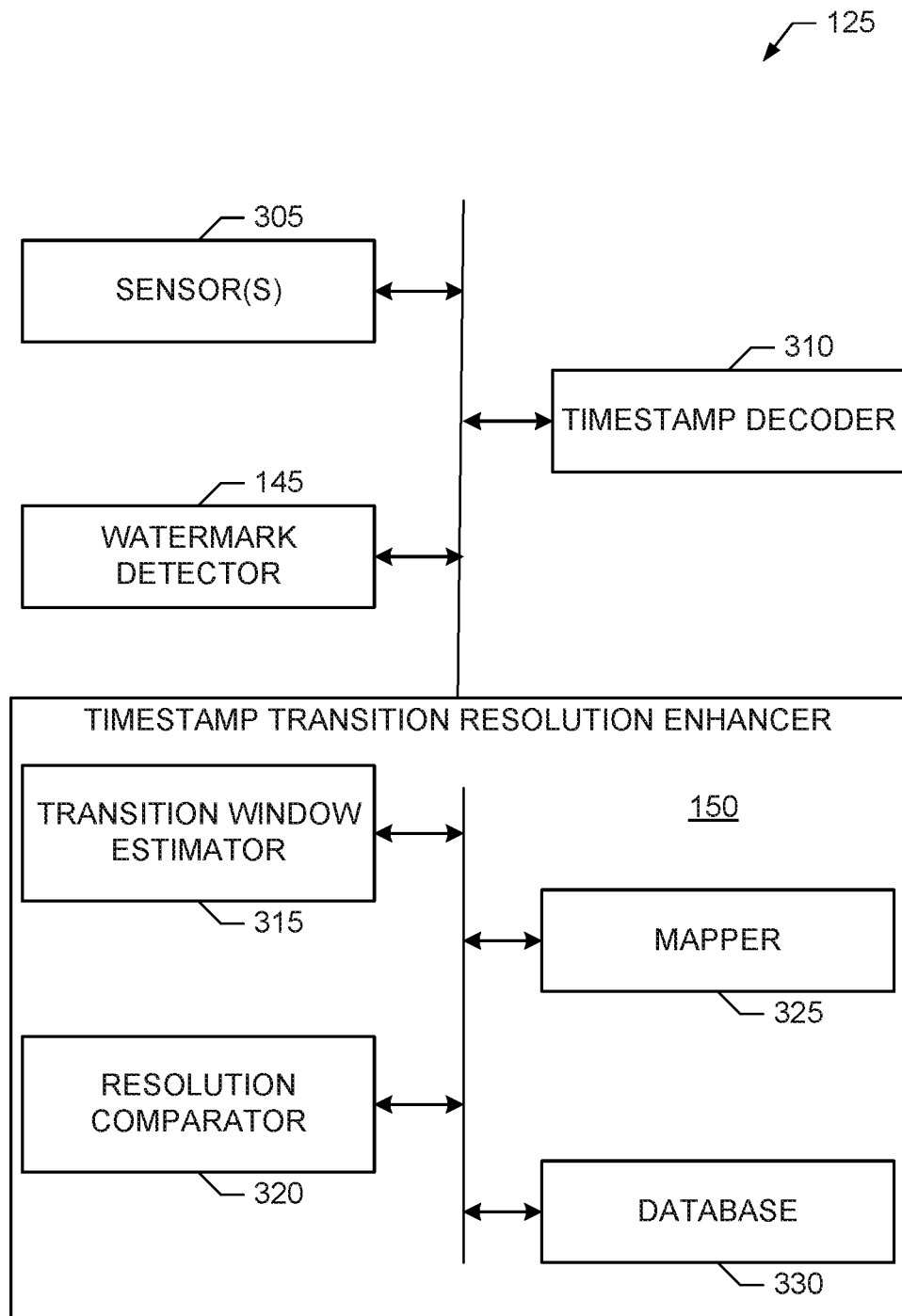
FIG. 3 a block diagram illustrating an example implementation of the timestamp transition resolution enhancer of FIG. 1.

In the illustrated example of FIG. 1, the media device meter 125 is implemented by a portable device including an example watermark detector 145 and an example timestamp transition resolution enhancer 150. In the illustrated example, the watermark detector 145 is configured to detect watermark(s) in media signal(s) output from a monitored media device, such as the example media device 110. In the illustrated example, the timestamp transition resolution enhancer 150 is configured to improve the timestamp transition resolution of the watermarks detected by the watermark detector 145. In some examples, the media device meter 125 corresponds to a special purpose portable device constructed to implement the example watermark detector 145 and the example timestamp transition resolution enhancer 150. In other examples, the media device meter 125 corresponds to any portable device capable of being adapted (via hardware changes, software changes, firmware changes, or any combination thereof) to implement the example watermark detector 145 and the example timestamp transition resolution enhancer 150. As such, the media device meter 125 can be implemented by a smartphone, a tablet computer, a handheld device, a wrist-watch type device (e.g., a smart watch such as the Apple Watch sold by Apple Inc.), other wearable devices, a special purpose device, etc. In some examples, the media device meter 125 can be implemented by a portable device that, although portable, is intended to be relatively stationary. Furthermore, in some examples, the media device meter 125 can be implemented by, or otherwise included in, the media device 110, such as when the media device 110 corresponds to a portable device (e.g., a smartphone, a tablet computer, a handheld device, etc.) capable of presenting media. This latter implementation can be especially useful in example scenarios in which a media monitoring application is executed on the media device 110 itself, but the media device 110 prevents, e.g., via digital rights management or other techniques, third-party applications, such as the media monitoring application, from accessing protected media data stored on the media device 110. An example implementation of the media device meter 125 is illustrated in FIG. 3, which is described in further detail below. Though described as incorporated with the media device meter 125, the timestamp transition resolution enhancer 150 may be incorporated additionally or alternatively with the data processing facility 140. Furthermore, in some examples, the media device meter 125 may additionally collect signatures.

Figure 2:
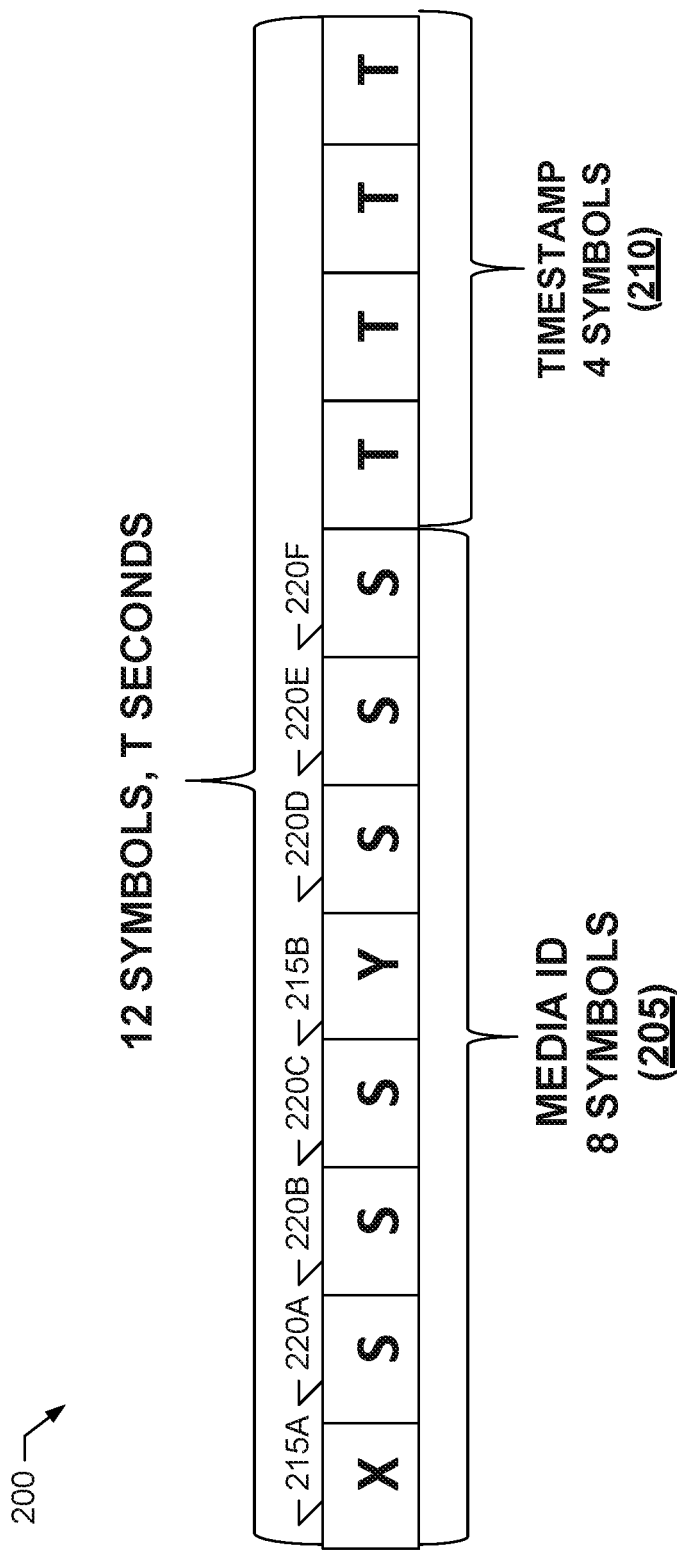
FIG. 2 illustrates an example watermark to be detected by the example media device monitor of FIG. 1.

FIG. 2 illustrates an example watermark 200 that the example media device meter 125 may be configured to detect. The watermark 200 of the illustrated is embedded or otherwise included in media to be presented by media device(s), such as the example media device 110. For example, the watermark 200 may be embedded in an audio portion (e.g., an audio data portion, an audio signal portion, etc.) of the media, a video portion (e.g., a video data portion, a video signal portion, etc.) of the media, or a combination thereof. The example watermark 200 of FIG. 2 includes an example first group of symbols 205 and an example second group of symbols 210. In the illustrated example of FIG. 2, the first group of symbols 205 is repeated in successive watermarks 200 embedded/included in the media, whereas the second group of symbols 210, which is indicative of a broadcast time, differs between successive watermarks 200 embedded/included in the media.

In the example watermark of FIG. 2, the first group of symbols 205 conveys media identification data (e.g., a media identifier) identifying the media watermarked by the watermark 200. For example, the media identification data conveyed by the first group of symbols 205 may include data identifying a broadcast station providing the media, a name (e.g., program name) of the media, a source (e.g., a website) of the media, etc. Thus, in the illustrated example of FIG. 2, the first group of symbols 205 is also referred to as a first group of media identification symbols 205 (or simply the media identification symbols 205). Furthermore, the media identification data conveyed by the first group of symbols 205 (e.g., the media identification symbols 205) is repeated in successive watermarks 200 embedded/included in the media.

In some examples, the first group of symbols 205 of the watermark 200 includes example marker symbols 215A-B to assist the watermark detector 145 in detecting the start of the watermark 200 in the watermarked media, and example data symbols 220A-F to convey the media identification data. Also, in some examples, corresponding symbols pairs in similar respective locations after the first marker symbol 215A and the second marker symbol 215B are related by an offset. For example, the value of data symbol 220D may correspond to the value of data symbol 220A incremented by an offset, the value of data symbol 220E may correspond to the value of data symbol 220B incremented by the same offset, and the value of data symbol 220F may correspond to the value of data symbol 220C incremented by the same offset, as well. In such examples, the symbols pairs 220A/D, 220B/E and 220C/F are referred to as symbol offset pairs, or offset pairs, and the offset used to generate the symbol offset pairs forms an additional data symbol that can be used to convey the media identification data.

In the example watermark 200 of FIG. 2, the second group of symbols 210 conveys timestamp data (e.g., a timestamp) identifying, for example, a particular elapsed time within the watermarked media. Thus, in the illustrated example of FIG. 2, the second group of symbols 210 is also referred to as the second group of timestamp symbols 210 (or simply the timestamp symbols 210). Furthermore, the timestamp data conveyed by the second group of symbols 210 (e.g., the timestamp symbols 210) differs in successive watermarks 200 embedded/included in the media (e.g., as the elapsed time of the watermarked media increases with each successive watermark 200).

In the illustrated example of FIG. 2, the watermark 200 is embedded/included in the desired media at a repetition interval of t seconds (or, in other words, at a repetition rate of 1/t seconds), with the first group of symbols 205 remaining the same in successive watermarks 200, and the second group of symbols 205 varying in successive watermarks 200 according to the time resolution supported by the symbols 205. For example, the symbols 205 may support a time resolution of one minute and, thus, will change on one minute boundaries. For example, the repetition interval t may correspond to t=4.8 seconds. As there are twelve symbols in the example watermark 200 (e.g., eight symbols in the first group of symbols 205 and four symbols in the second group of symbols 210) each watermark symbol in the illustrated example has a duration of 4.8/12=0.4 seconds. However, other values for the repetition interval t may be used in other examples.

In some examples, a watermark symbol included in the watermark 200 is able to take on one of several possible symbol values. For example, if a symbol in the watermark 200 represents four bits of data, then the symbol is able to take on one of sixteen different possible values. For example, each possible symbol value may correspond to a different signal amplitude, a different set of code frequencies, etc. In some such examples, to detect a watermark symbol embedded/included in watermarked media, the example watermark detector 145 processes monitored media data/signals output from the example media device 110 to determine measured values (e.g., signal-to-noise ratio (SNR) values) corresponding to each possible symbol value the symbol may have. The watermark detector 145 then selects the symbol value corresponding to the best (e.g., strongest, largest, etc.) measured value (possibly after averaging across multiple samples of the media data/signal) as the detected symbol value for that particular watermark symbol.

An example implementation of the media device meter 125 (e.g., which may be a portable device) of FIG. 1 is illustrated in FIG. 3. In the illustrated example of FIG. 3, the media device meter 125 includes one or more example sensor(s) 305 to detect media data/signal(s) emitted or otherwise output by the example media device 110. In some examples, the sensor(s) 305 include an audio sensor to monitor audio data/signal(s) output by the media device 110. Such an audio sensor may be implemented using any type of audio sensor or audio interface, such as a microphone, a transducer, a cable/wire, etc., capable of receiving and processing audio signals (e.g., such as in the form of acoustic and/or electrical signals). Additionally or alternatively, in some examples, the sensor(s) 305 include a video sensor to monitor video data/signal(s) output by the media device 110. Such a video sensor may be implemented using any type of video sensor or video interface, such as a camera, a light detector, a cable/wire, etc., capable of receiving and processing video signals (e.g., such as in the form of optical images and/or electrical signals).

The example media device meter 125 of FIG. 3 also includes the example watermark detector 145. In the illustrated example of FIG. 3, the watermark detector 145 is configured to detect watermarks, such as the example watermark 200 of FIG. 2, in the media data/signal(s) detected by the example sensor(s) 305. In some examples, the watermark detector 145 of FIG. 3 is structured to process audio data/signal(s) obtained by the sensor(s) 305 to detect symbols of instances of the watermark 200 that are encoded in one or more frequencies of the sensed audio data/signal(s), or otherwise encoded in the frequency domain of the sensed audio data/signal(s). Examples of encoding watermarks in the frequency domain of an audio signal, and corresponding example watermark detection techniques that may be implemented by the example watermark detector 145, are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their entireties. U.S. Pat. Nos. 8,359,205, 8,369,972, U.S. Publication No. 2010/0223062, U.S. Pat. Nos. 6,871,180, 5,764,763, 5,574,962, 5,581,800, 5,787,334, and 5,450,490 describe example watermarking systems in which a watermark is included in an audio signal by manipulating a set of frequencies of the audio signal.

In some examples, the watermark detector 145 of FIG. 3 is structured to process audio data/signal(s) obtained by the sensor(s) 305 to detect symbols of instances of the watermark 200 that are encoded in one or more time domain characteristics of the sensed audio signal, such as by modulating the amplitude and/or phase of the audio signal in the time domain. Examples of encoding watermarks in the time domain of an audio signal, and corresponding example watermark detection techniques that may be implemented by the example watermark detector 145, include, but are not limited to, examples in which spread spectrum techniques are used to include a watermark in an audio signal. For example, such a watermark can be encoded in the audio signal by (1) spreading the watermark by modulating the watermark with a pseudo-noise sequence and then (2) combining the spread watermark with the audio signal. Detection of such a watermark involves correlating the audio signal (after being watermarked) with the pseudo-noise sequence, which de-spreads the watermark, thereby permitting the watermark to be detected after the correlation.

Figure 4:
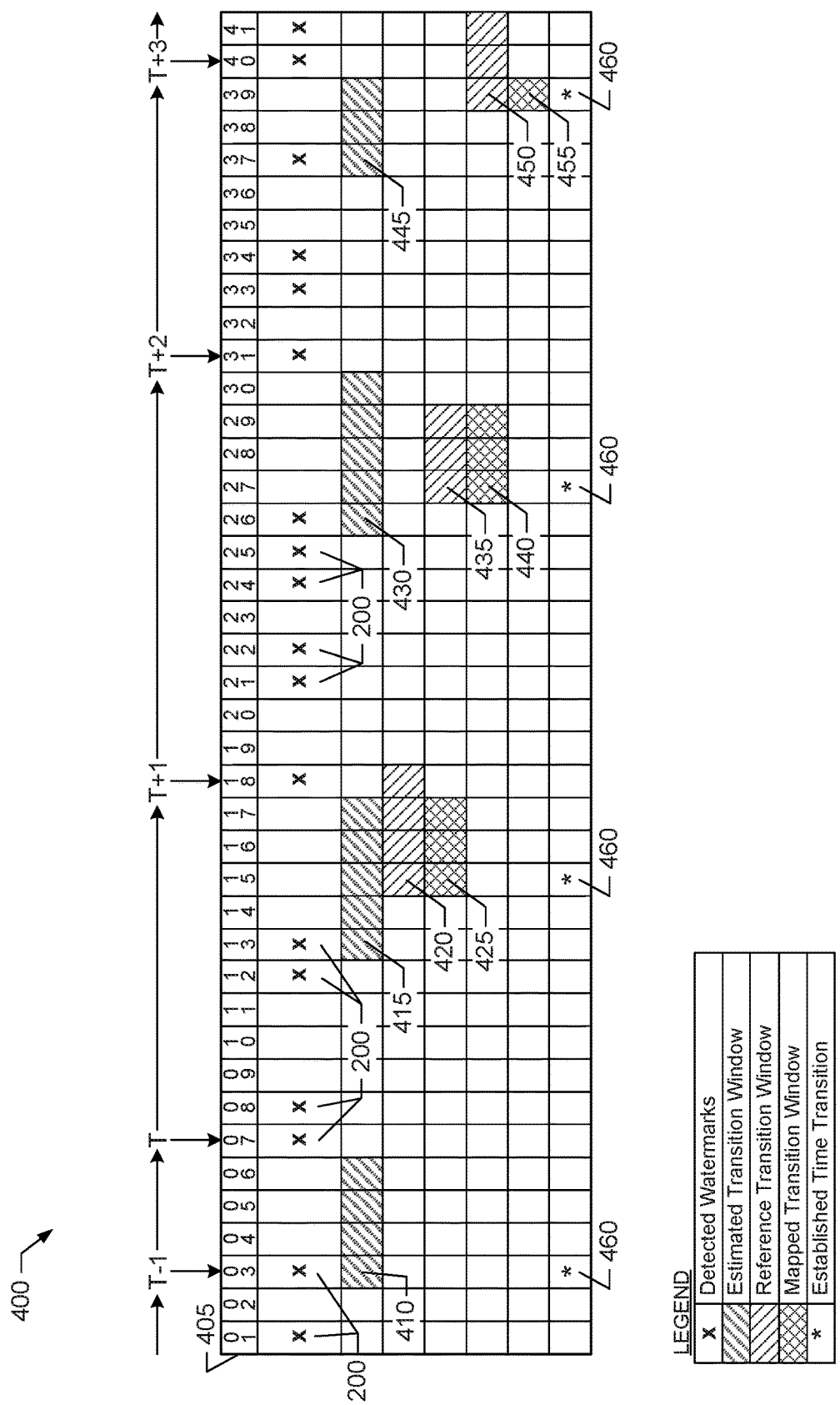
FIG. 4 illustrates an example mapping of detected watermarks, timestamps, and timestamp transition resolution enhancement performed in accordance with the teachings of this disclosure.

FIG. 4 illustrates an example mapping 400 of segments of a media signal over time. The first row represents the media segments 405(01-41) during which a watermark 200 is broadcast. In the example mapping 400, each media segment 405 may have, for example, a duration of five seconds. Thus, there are twelve segments in one minute of a media broadcast. In other examples, other media segment durations may be used including, for example, 4.8 seconds and/or any other desired amount. The "X" in the second row represents the watermarks 200 detected by the watermark detector 145. In this example, the watermark detector 145 detects eighteen watermarks 200. Some of the media segments 405 are not associated with a detected watermark. In such examples, the signal may have been obscured by, for example, noise, and the watermark detector 145 may not have been able to detect an associated watermark.

As shown in FIG. 3, the example media device meter 125 also includes an example timestamp decoder 310. The timestamp decoder 310 reads the timestamp symbols 210 from the watermark 200 detected by the watermark detector 145. The time indicated by the timestamp symbols 210 is associated with the media broadcast with which the detected watermark 200 is broadcast. In the example mapping 400 of FIG. 4, the timestamp decoder 310 having read the timestamps in the watermarks 200, determines that the time is T−1 in the second detected watermark 200 of the third media segment 405(03). In the third detected watermark 200 of the seventh media segment 405(07), the timestamp is T. The timestamp reads as time T until the timestamp decoder 310 determines the time is T+1 at the seventh detected watermark 200 of the eighteenth media segment 405(18). The detection and decoding process continues throughout operation of the media device meter 125. In the example shown, a time change to T+2 is detected at the thirteenth detected watermark 200 of the thirty-first media segment 405(31), and a time change to T+3 is detected at the seventeenth detected watermark 200 of the fortieth media segment 405(40).

With the information available from the watermark detector 145 and the timestamp decoder 310, the media device meter 125 and/or data processing facility 400 can determine estimated transition windows or coarse transitions windows indicative of when the time of the media broadcast for the associated media segment 405 advanced to the next time unit (e.g., next minute of the day). For example, the media device includes the timestamp transition resolution enhancer 150 which has an example transition window estimator 315. The transition window estimator 315 determines the estimated transition window based on a difference between two detected watermarks. As shown in FIG. 4, the time of the media broadcast is T−1 for the third media segment 405(03). At the seventh media segment 405(07), the detected watermark 200 indicates that the time of the broadcast is T. Thus, the time changed from T−1 to T in between the broadcast of the third media segment 405(03) and the seventh media segment 405(07). As shown in FIG. 4, there are several media segments 405(04-06) between the media segments 405 associated with the different watermarks 200. In this example, these three media segments 405(04-06) lack detected watermarks due to, for example, obfuscations from noise. Thus, it is not known when exactly the time period switched between T−1 and T. This could have occurred immediately after the third media segment 405(03) was broadcast up until the seventh media segment 405(07) was broadcast. Thus, there is a window of time during which the time transition occurred. In this example, the transition window estimator 315 determines a first estimated transition window 410 between time T−1 and T.

The example timestamp transition resolution enhancer 150 also includes an example resolution comparator 320. The resolution comparator 320 compares the duration of a transition window to a threshold to determine if the duration of the transition window meets the threshold. The threshold establishes the desired resolution of the timestamp transition. In the example where the media segments 405 of FIG. 4 have a five second duration, the first estimated transition window 410 is shown as twenty seconds. That is, the time switched from T−1 to T sometime during those twenty seconds. The resolution comparator 320 compares the time period of twenty seconds to a threshold which may be set, for example, at five seconds. That is, in this example, a timestamp transition resolution of five seconds is desired. In other examples, the threshold is any desirable level of resolution. In this example, the twenty second duration of the first estimated transition window 410 does not meet the threshold of five seconds. Thus, the timestamp transition resolution enhancer 150 continues operation to improve the resolution of the time transition window. If the first estimated transition window 410 does meet the threshold, the timestamp transition resolution enhancer 150 sets the first estimated transition window 410 as the established time transition or the baseline moment of transition.

During continued operation, the example transition window estimator 315 determines subsequent time transitions and the corresponding transition windows. In the illustrated example, the example transition window estimator 315 determines a second estimated transition window 415 between the detection of time T at the sixth detected watermark 200 of the thirteenth media segment 405(13) and time T+1 at the seventh detected watermark 200 of the eighteenth media segment 405(18). In this example, the second estimated transition window 415 is twenty-five seconds long, which is longer in duration than the first estimated transition window 410 and, therefore, alone does not improve the timestamp transition resolution.

The timestamp transition resolution enhancer 150 also includes an example mapper 325 that aligns or maps a reference transition window with an estimated transition window. For example, when the resolution comparator 320 determines that an estimated transition window does not meet the threshold, the mapper 320 uses the estimated transition window as a reference transition window and maps or aligns the reference transition window with a subsequent estimated transition window. A first estimated transition window can be used to predict subsequent estimated transition windows because the transitions between time periods is cyclical. A second estimated transition window and the first estimated transition window (used as a reference transition window) can be used to refine or improve the estimate of the timestamp transition.

In the example of FIG. 4, the first estimated transition window 410 has a duration of twenty seconds. When the media segments 405 are of a five second duration, there are twelve segments in a minute. Thus, the first transition window 410 would indicate subsequent transition windows every minute or twelve media segments 405. Thus, in this example, the first transition window 410 is used by the mapper 325 to predict, or estimate, a first reference transition window 420 by mapping the first estimated transition window 410 down twelve media segments 405 to form the first reference transition window 420 in alignment with the second estimated transition window 415. More specifically, in the example mapping 400 of FIG. 4, the first estimated transition window 410 appears between the third and sixth media segments 405(03-06). When the first estimated transition window 410 is mapped down (in this example one minute), the next estimate for a window transition or the first reference transition window 420 appears twelve media segments later or the fifteenth media segment 405(15) to the eighteenth media segment 405(18).

Based on the second estimated transition window 415, the timestamp transition resolution enhancer 150 can determine that a change in the time period occurred between the watermark 200 detected in the thirteenth media segment 405(13) and the watermark 200 detected in the seventeenth media segment 405(17). However, the mapping of the first estimated transition window 410 as the first reference transition window 420 shows that the change in the time period occurred during one of the fifteenth to eighteenth media segments 405(15-18). With these two estimates, the mapper 325 determines that the change in the time period between T and T+1 occurred during the intersection of these two windows, namely, during the media segments 405(15-17) that overlap, or intersect, between the second estimated transition window 415 and the first reference transition window 420, which forms a first mapped transition window 425. Compared to the coarser first estimated transition window 410 and second estimated transition window, the first mapped transition window 425 represents a fine transition window in which the transition resolution has been improved.

The resolution comparator 320 compares the first mapped transition window 425 to the threshold. If the first mapped transition window meets the threshold, the timestamp transition resolution enhancer 150 sets the first mapped transition window 425 as the established time transition or the baseline moment of transition. In the example of FIG. 4, the first mapped transition window 425 has a duration of fifteen seconds and fails to meet the threshold of five seconds.

If a desired level of resolution is not met, the timestamp transition resolution enhancer 150 continues operation to improve the resolution of the time transition window, which includes repetition of one or more of the operations identified above. For example, in the illustrated example, the example transition window estimator 315 determines a third estimated transition window 430 between the detection of time T+1 at the twenty-sixth media segment 405(26) and time T+2 at the thirty-first media segment 405(31). In this example, the third estimated transition window 430 is twenty-five seconds long, which is longer in duration than the first mapped transition window 425 and, therefore, alone does not improve the timestamp transition resolution.

The mapper 325 uses the first mapped transition window 425, to predict, or estimate, a second reference transition window 435 and aligns or maps the second reference transition window 435 with the third estimated transition window 430. In this example, the first mapped transition window 425 occurs during the fifteenth, sixteenth, or seventeenth media segments 405(15-17). When mapped over an additional time period (e.g., a minute) as the second reference transition window 435, the duration for a subsequent timestamp transition is during the twenty-seventh, twenty-eight, or twenty-ninth media segment 405(27-29).

Based on the third estimated transition window 415, the timestamp transition resolution enhancer 150 can determine that a change in the time period occurred between the twenty-sixth and thirtieth media segments 405(26-30). However, the mapping of the first mapped transition window 425 as the second reference transition window 435 shows that the change in the time period occurred during the twenty-seventh, twenty-eight, or twenty-ninth media segment 405 (27-29). With these two estimates, the mapper 325 determines that the change in the time period between T+1 and T+2 occurred during the media segments 405 that overlap between the third estimated transition window 430 and the second reference transition window 435, which forms the second mapped transition window 440.

The resolution comparator 320 compares the second mapped transition window 440 to the threshold. If the second mapped transition window 440 meets the threshold, the timestamp transition resolution enhancer 150 sets the second mapped transition window 440 as the established time transition or the baseline moment of transition. In the example of FIG. 4, because the first mapped transition window 435 is wholly overlapped by the third estimated transition window 430, there is no further improvement to the transition window resolution. Specifically, in this example, the transition window remains fifteen seconds and fails to meet the threshold of five seconds.

As noted above, when a desired level of resolution is not met, the timestamp transition resolution enhancer 150 continues operation to improve the resolution of the time transition window. For example, in the illustrated example, the example transition window estimator 315 determines a fourth estimated transition window 445 between the detection of time T+2 at the thirty-first media segment 405(31) and time T+3 at the fortieth media segment 405(40). In this example, the fourth estimated transition window 445 is fifteen seconds long, which is not shorter in duration than the second mapped transition window 440 and, therefore, alone does not improve the timestamp transition resolution.

The mapper 325 uses the second mapped transition window 440 to predict, or estimate, a third reference transition window 450 and aligns or maps the second reference transition window 450 with the fourth estimated transition window 445. In this example, the second mapped transition window 440 occurs during the twenty-seventh, twenty-eight, or twenty-ninth media segment 405(27-29). When mapped over an additional time period (e.g., a minute) as the third reference transition window 450, the duration of the subsequent timestamp transition is during the thirty-ninth, fortieth, and forty-first media segments 405(39-41).

Based on the fourth estimated transition window 445, the timestamp transition resolution enhancer 150 can determine that a change in the time period occurred between the thirty-seventh and thirty-ninth media segments 405(37-39). However, the mapping of the second mapped transition window 440 as the third reference transition window 450 shows that the change in the time period occurred during the thirty-ninth, fortieth, and forty-first media segments 405(39-41). With these two estimates, the mapper 325 determines that the change in the time period between T+2 and T+3 occurred during the media segment 405 that overlaps, or intersects, between the fourth estimated transition window 445 and the third reference transition window 450, which forms the third mapped transition window 455. In this example, the third mapped transition window 455 is the thirty-ninth media segment 405(39).

The resolution comparator 320 compares the third mapped transition window 455 to the threshold. If the third mapped transition window 455 does not meet the threshold, the timestamp transition resolution enhancer continues through these operations to continue to improve the resolution. If the third mapped transition window 455 meets the threshold, the timestamp transition resolution enhancer 150 sets the third mapped transition window 455 as the established time transition or the baseline moment of transition 460. In the example of FIG. 4, the third mapped transition window 450 has a duration of five seconds and meets the threshold.

When a moment of time transition that meets the threshold is achieved, the established time transition 460 is determined. The established time transition 460 is stored in a database 330 in the media device meter 125, for example. The database 330 may be used for storage and retrieval of some or all data disclosed herein including, for example, data from the sensor(s) 305, the watermarks 200, the estimated transition windows 410, 415, 430, 445, the reference transition windows 420, 435, 450, and the mapped transition windows 425, 440, 455.

When the established time transition 460 is determined, the timestamp transition resolution enhancer 150 retroactively maps prior time transitions in the media signal and/or proactively maps subsequent transitions in the media signal based on the established time transition 460. For example, in the mapping 400 of FIG. 4, the established time transition 460 is set at the thirty-ninth media segment 405(39). Thus, the transition between time period T+2 and time period T+3 occurred during the thirty-ninth media segment 405(39). One unit of the time measurement divided into the media segments can be used to accurately locate the prior time transition, i.e., the transition between time period T+1 and T+2. In the example of FIG. 4, where the unit of time measurement is one minute and there are five second segments, the timestamp transition resolution enhancer 150 counts back twelve segments and determines that the established transition 460 between time T+1 and time T+2 occurred during the twenty-seventh media segment 405(27). Similarly, the timestamp transition resolution enhancer 150 determines that the established time transition 460 between time T and time T+1 occurred during the fifteenth media segment 405(15), and the established time transition 460 between time T−1 and time T occurred during the third media segment 405(03).

In some examples, the timestamp transition resolution enhancer 150 implements a voting scheme to assess the value of data. In this example, the timestamp transition resolution enhancer 150 discards data indicative of errors. For example, data showing a decrease in a time value, data between watermarks of consecutive media segments showing a missed time unit (e.g., a skipped minute), and other erroneous or questionable data can be ignored.

While an example manner of implementing the media device meter 125 of FIG. 1 is illustrated in FIG. 3, one or more of the elements, processes and/or devices illustrated in FIG. 3 may be combined, divided, re-arranged, omitted, eliminated and/or implemented in any other way. Further, the example watermark detector 145, the example timestamp transition resolution enhancer 150, the example sensor(s) 305, the example timestamp decoder 310, the example transition window estimator 315, the example resolution comparator 320, the example mapper 325, the example databased 330, and/or, more generally, the example media device meter 125 of FIG. 3 may be implemented by hardware, software, firmware and/or any combination of hardware, software and/or firmware. Thus, for example, any of the example watermark detector 145, the example timestamp transition resolution enhancer 150, the example sensor(s) 305, the example timestamp decoder 310, the example transition window estimator 315, the example resolution comparator 320, the example mapper 325, the example databased 330, and/or, more generally, the example media device meter 125 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, watermark detector 145, the example timestamp transition resolution enhancer 150, the example sensor(s) 305, the example timestamp decoder 310, the example transition window estimator 315, the example resolution comparator 320, the example mapper 325, the example databased 330, and/or the example media device meter 125 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media device meter 125 of FIG. 3 may include one or more elements, processes and/or devices in addition to, or instead of, those illustrated in FIG. 3, and/or may include more than one of any or all of the illustrated elements, processes and devices.

Figure 5:
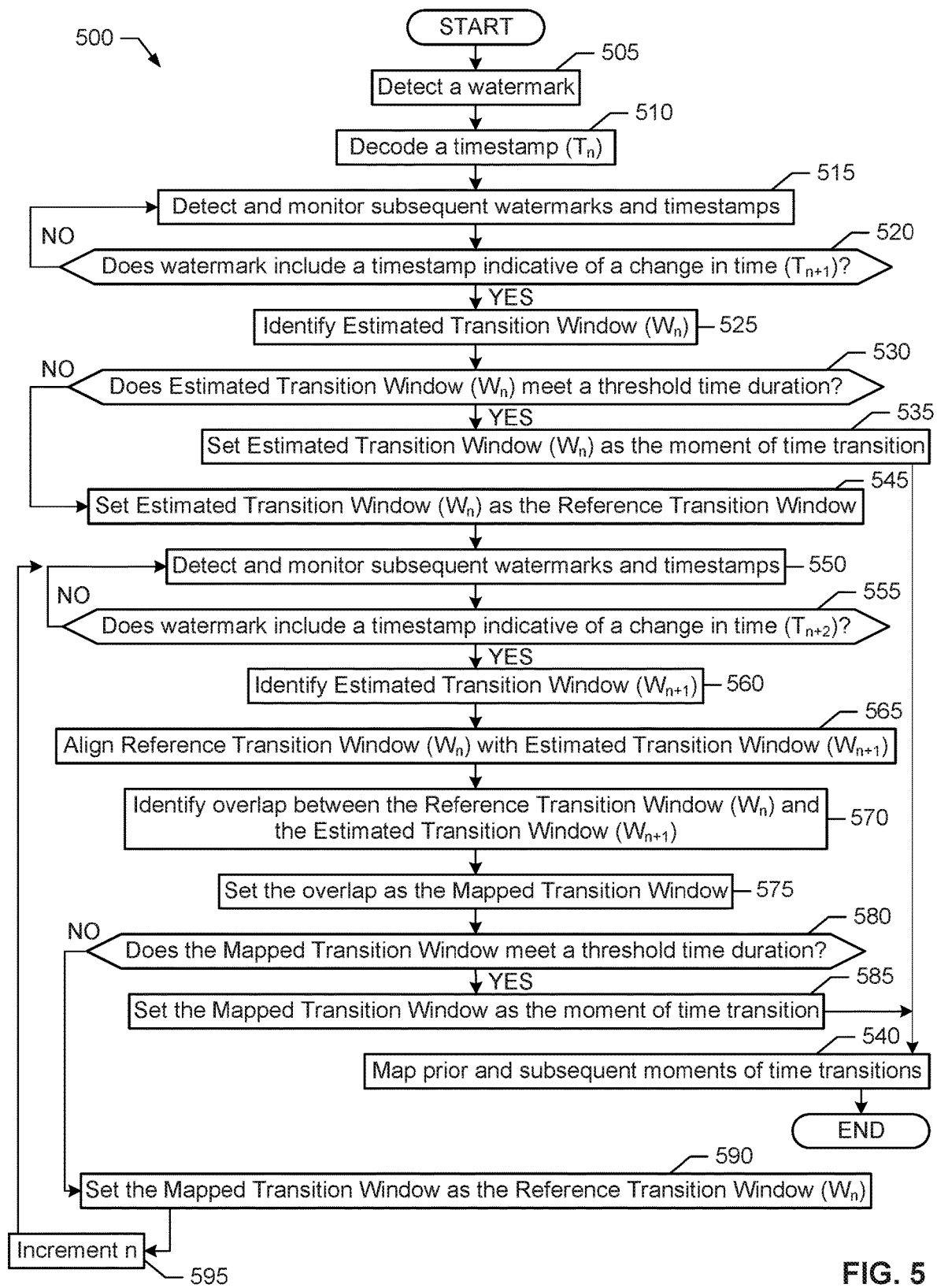
FIG. 5 is a flowchart representative of first example machine readable instructions that may be executed to implement the example media monitoring system of FIG. 1 and/or the example timestamp transition resolution enhancer of FIG. 3.

A flowchart representative of example machine readable instructions for implementing the media device meter 125 of FIG. 3 is shown in FIG. 5. In this example, the machine readable instructions comprise a program for execution by a processor such as the processor 1012 shown in the example processor platform 1000 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 5, many other methods of implementing the example media device meter 125 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example machine readable instructions 500 of FIG. 5 begin at block 505 when the watermark detector 145 detects one or more watermarks 200 from a media signal. The example timestamp decoder 310 decodes a timestamp (Tn) from the watermarks (block 510) (in some examples n is initially set at 0). For example, the timestamp decoder 310 reads timestamps such as timestamp symbols 210 from the watermark 200. The example timestamp decoder 310 analyzes a media signal to detect and monitor subsequent watermarks and timestamps (block 515). The example timestamp transition resolution enhancer 150 determines if a watermark includes a timestamp indicative of a change in time (Tn+1) (block 520). For example, the watermark 200 includes time symbols 210 that indicate the time at which the watermark 200 and associated media content was broadcast. As the time of day progresses, the time symbols 210 change. Eventually, a subsequent watermark 200 will include a timestamp that indicates a change of time from (Tn) to (Tn+1).

If a watermark 200 does not include a timestamp indicative of a change in time (block 520), the example timestamp decoder 310 continues to detect and decode watermarks and timestamps (block 515). However, if a watermark 200 does include a timestamp indicative of change in time (block 520), the example transition window estimator 315 of the example timestamp transition resolution enhancer 150 identifies an estimated transition window (Wn) (block 525). For example, the transition window estimator 315 determines a duration of time or time window during which the time changed from one time period to a second time period based on the duration between the two watermarks with disparate timestamps. As disclosed in the example above, the transition window estimator 315 determines the first estimated transition window 410.

The example resolution comparator 320 of the example timestamp transition resolution enhancer 150 determines if the estimated transition window (Wn) meets or satisfies a threshold time duration (block 530). In some examples, the threshold is set at five seconds, though other values may be used. If the estimated transition window (Wn) is five seconds or less, in this example, the resolution comparator 320 will determine that the threshold is met. In other words, the desired resolution of estimating when a time transition occurred has been satisfied. When the estimated transition window (Wn) is determined to meet the threshold (block 530), the example timestamp transition resolution enhancer 150 continues and sets the estimated transition window (Wn) as the moment of time transition (block 535).

When the moment of time transition is set (block 535), the example timestamp transition resolution enhancer 150 retroactively and/or proactively sets prior and/or subsequent moments of time transitions (block 540). For example, the timestamp transition resolution enhancer 150 sets the established moment of time transition 460 when the resolution threshold is met. Once a moment of time transition is established with the desired resolution, other moments of time transition can be determined based on the number of media segments in a time unit. In the example disclosed above, there are five second media segments and, therefore, twelve segments in a minute. When the threshold of five seconds (e.g., one media segment) is met, the timestamp transition resolution enhancer 150 sets the moment of time transition 460 and can count forward and/or backward twelve media segments to mark or otherwise note moments of other time transitions. When the moments of time transition are marked to the desired resolution level, the example program 500 ends.

When the estimated transition window (Wn) does not meet the threshold time duration (block 530), the example timestamp transition resolution enhancer 150 continues and sets the estimated transition window (Wn) as a reference transition window (block 545). For example, the timestamp transition resolution enhancer 150 sets the first estimated transition window 410 as the first referenced transition window 420 when the first estimated transition window 410 fails to meet the threshold.

The example timestamp decoder 310 and the example timestamp transition resolution enhancer 150 continue and analyze the media signal to detect and monitor subsequent watermarks and timestamps (block 550) to detect a watermark including a timestamp indicative of a change in time (Tn+2) (block 555). If a watermark 200 does not include a timestamp indicative of a change in time (block 555), the example timestamp transition resolution enhancer 150 continues to detect and decode watermarks and timestamps (block 550). However, if a watermark 200 does include a timestamp indicative of change in time (block 555), the example timestamp transition resolution enhancer 150 identifies an estimated transition window (Wn+1) (block 560). For example, the transition window estimator 315 determines a duration of time or time window during which the time changes from a second time period to a third time period based on the duration between the two watermarks with disparate timestamps. As disclosed in the example above, the transition window estimator 315 determines the second estimated transition window 415.

Though not explicitly shown in FIG. 5, in some examples, the example timestamp transition resolution enhancer 150 determines if the estimated transition window between the second time period and the third time period meets the threshold similar to block 530. If the threshold is met, the example program would continue through blocks 535 and 540 as detailed above.

When the estimated transition window (Wn+1) is determined (block 560), and the estimated transition window (Wn+1) fails to meet the threshold or is not compared to the threshold, the example mapper 325 of the example timestamp transition resolution enhancer 150 maps or aligns the reference transition window (Wn) with the estimated transition window (Wn+1) (block 565). For example, the mapper 325 maps the first estimated transition window 410 as the first reference transition window 420 to the second estimated transition window 415. The example timestamp transition resolution enhancer 150 determines an overlap between the reference transition window (Wn) and the estimated transition window (Wn+1) (block 570). For example, the timestamp transition resolution enhancer 150 determines what media segments 405(15-17) overlap between the media segments 405(15-18) broadcast during the duration of the first reference transition window 420 and the media segments 405(13-17) broadcast during the duration of the second estimated transition window 415. The example timestamp transition resolution enhancer 150 sets the overlap as the mapped transition window (block 575). In the example disclosed above, the timestamp transition resolution enhancer 150 sets the overlap between the second estimated transition window 415 and the first reference transition window 420 as the first mapped transition window 425. In another example, the timestamp transition resolution enhancer 150 sets the overlap between the fourth estimated transition window 445 and the third reference transition window 450 as the third mapped transition window 455.

The example resolution comparator 320 of the example timestamp transition resolution enhancer 150 determines if the mapped transition window meets a threshold time duration (block 580). In some examples, the threshold is set at five seconds, though other values may be used. If the mapped transition window is five seconds or less, in this example, the resolution comparator 320 will determine that the threshold is met. In other words, the desired resolution of estimating when a time transition occurred has been satisfied. When the mapped transition window is determined to meet the threshold (block 580), the example timestamp transition resolution enhancer 150 continues and sets the mapped transition window as the moment of time transition (block 585). In one of the examples disclosed above, the resolution comparator 320 determines that the third mapped transition window 455 meets the threshold of five seconds. The timestamp transition resolution enhancer 150 sets the third mapped transition window 455 as the established time transition 460.

When the moment of time transition is set (block 585), the example timestamp transition resolution enhancer 150 retroactively and/or proactively sets prior and/or subsequent moments of time transitions (block 540), as disclosed above. For example, the timestamp transition resolution enhancer 150 sets the established moment of time transitions 460 when the resolution threshold is met for other time transitions during the broadcast of the media signal. When the moments of time transition are marked to the desired resolution level, the example program 500 ends.

If the mapped transition window fails to the meet the threshold time duration (block 580), the example timestamp transition resolution enhancer 150 sets the mapped transition window as the reference transition window (Wn) (block 590). For example, when the first mapped transition window 425 fails to meet the threshold of five seconds, the timestamp transition resolution enhancer 150 sets the first mapped transition window 425 as the second reference transition window 435. Thereafter, the example timestamp decoder 310 and the example timestamp transition resolution enhancer 150 continue to monitor the media signal and repeating the analysis by returning to block 550, after incrementing n (block 595) to indicate the subsequent time periods being analyzed.

The example timestamp decoder 310 and the example timestamp transition resolution enhancer 150 continue execution until it is determined that the duration of the mapped transition window satisfies the threshold setting the desired resolution of a time transition window (block 580). When the threshold is satisfied, or the desired resolution is otherwise determined to be met, the example timestamp transition resolution enhancer 150 proceeds through setting the mapped transition window as the moment of time transition (block 585) and mapping prior and/or subsequent time transition (block 540) as disclosed above until the example program 500 ends.

Figure 6:
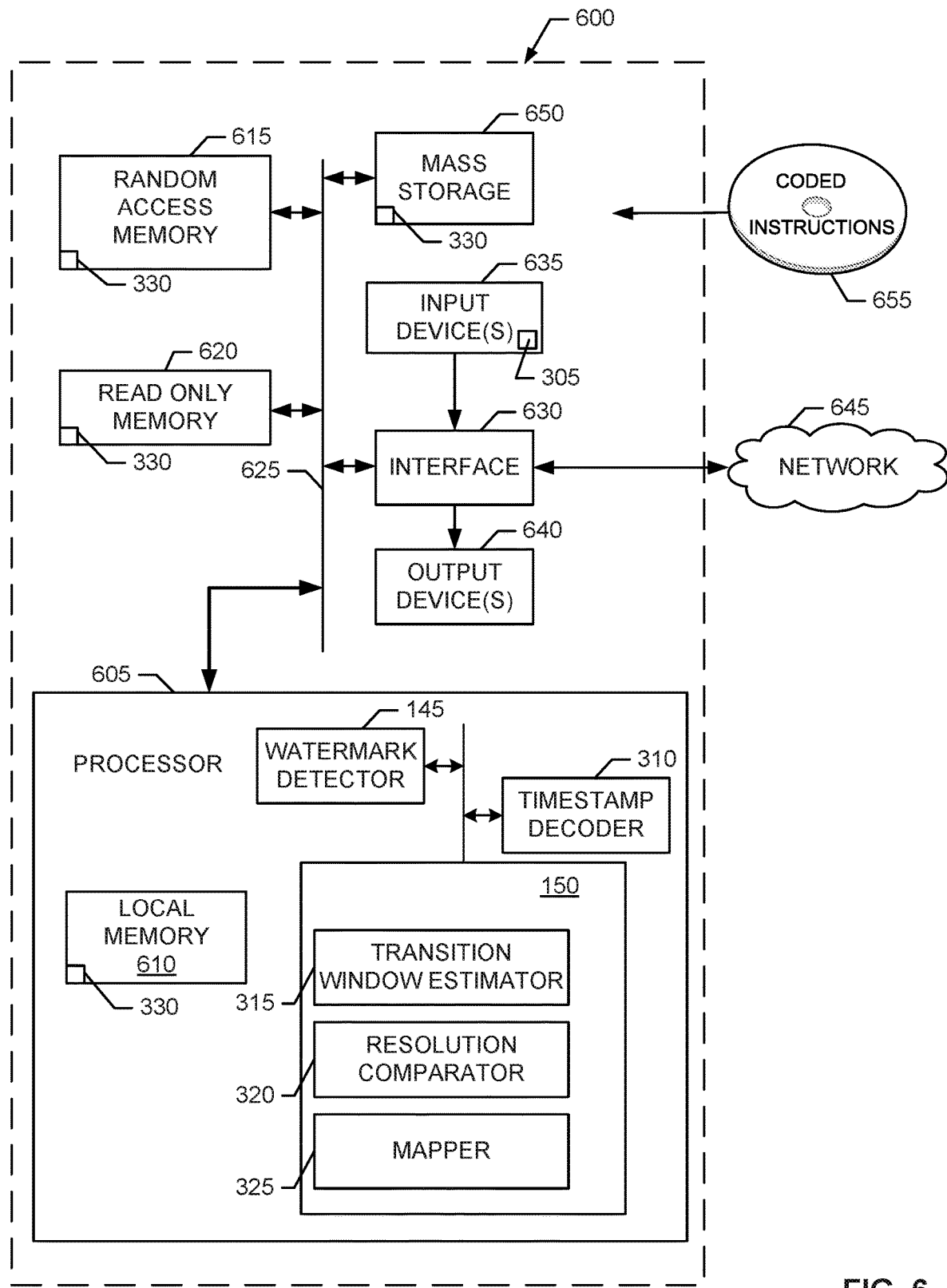
FIG. 6 is a block diagram of an example processor platform structured to execute the example machine readable instructions of FIG. 5 to implement the example media monitoring system of FIG. 1 and/or the example timestamp transition resolution enhancer of FIG. 3.

FIG. 6 is a block diagram of an example processor platform 600 structured to execute the instructions of FIG. 5 to implement the media device meter 125 of FIG. 3. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 605. The processor 605 of the illustrated example is hardware. For example, the processor 605 can be implemented by one or more integrated circuits, logic circuits, microprocessors or controllers from any desired family or manufacturer. The hardware processor may be a semiconductor based (e.g., silicon based) device. In this example, the processor 605 implements the example watermark detector 145, the example timestamp transition resolution enhancer 150, the example timestamp decoder 310, the example transition window estimator 315, the example resolution comparator 320, and the example mapper 325.

The processor 605 of the illustrated example includes a local memory 610 (e.g., a cache). The processor 605 of the illustrated example is in communication with a main memory including a volatile memory 615 and a non-volatile memory 620 via a bus 625. The volatile memory 615 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 615, 620 is controlled by a memory controller.

The processor platform 600 of the illustrated example also includes an interface circuit 630. The interface circuit 630 may be implemented by any type of interface standard, such as an Ethernet interface, a universal serial bus (USB), and/or a PCI express interface.

In the illustrated example, one or more input devices 635 are connected to the interface circuit 630. The input device(s) 635 permit(s) a user to enter data and/or commands into the processor 605. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 640 are also connected to the interface circuit 630 of the illustrated example. The output devices 640 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 630 of the illustrated example, thus, typically includes a graphics driver card, a graphics driver chip and/or a graphics driver processor.

The interface circuit 630 of the illustrated example also includes a communication device such as a transmitter, a receiver, a transceiver, a modem and/or network interface card to facilitate exchange of data with external machines (e.g., computing devices of any kind) via a network 645 (e.g., an Ethernet connection, a digital subscriber line (DSL), a telephone line, coaxial cable, a cellular telephone system, etc.).

The processor platform 600 of the illustrated example also includes one or more mass storage devices 650 for storing software and/or data. Examples of such mass storage devices 650 include floppy disk drives, hard drive disks, compact disk drives, Blu-ray disk drives, RAID systems, and digital versatile disk (DVD) drives.

The coded instructions 655 of FIG. 5 may be stored in the mass storage device 655, in the volatile memory 615, in the non-volatile memory 620, and/or on a removable tangible computer readable storage medium such as a CD or DVD.

From the foregoing, it will be appreciated that example methods, apparatus and articles of manufacture have been disclosed that improve or enhance the resolution of a timestamp transition window. Media signals contain watermarks with timestamps indicative of the time of broadcast of the portion of the media signal associated with the watermark. Media content providers and advertisers want to know precisely when their media was broadcast, and the timestamps in the watermarks are used to provide this information.

In some prior watermarking solutions, the exact broadcast time of media broadcast in time slots smaller than the transition window will go undetected. For example, a transition window of one minute will not identify exactly when an advertisement with a duration of twenty seconds was broadcast. An advertiser who paid for a twenty second advertisement spot at the beginning of a minute-long advertisement break would want to know that their advertisement was in fact broadcast during the first twenty seconds of the advertisement break. This level of precision cannot be provided when the timestamp transition window is too large. Examples disclosed herein improve the timestamp transition resolution to overcome the limitation of the prior art. In some examples, the resolution is improved to five seconds. The improved resolution enables the exact broadcast times of each moment of the media signal to be pinpointed down to the resolution threshold (e.g., 5 seconds). This improvement has been developed and is usable without requiring the broadcast of additional watermarks, enhanced detection techniques to capture more watermarks, or a more finite segmentation of media signals.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   memory; and
   a processor to execute computer readable instructions to:
   identify a first transition window between a first watermark detected in media and a second watermark detected in the media;
   calculate a first number of time units between the first watermark and the second watermark;
   when the first number of time units is greater than a threshold,
     set the first transition window as a first reference transition window, and
     map the first reference transition window forward by a second number of time units;
   identify a second transition window between the second watermark and a third watermark detected in the media;
   calculate a third number of time units between the second watermark and the third watermark;
   when the third number of time units is greater than the threshold,
     calculate a fourth number of time units included in an overlap between the first reference transition window and the second transition window, and
   when the fourth number of time units is less than or equal to the threshold,
     set the overlap between the first reference transition window and the second transition window as an established time transition.

2. The system of claim 1, wherein the threshold is one time unit.

3. The system of claim 1, wherein the processor is to identify a plurality of moments of transition between the watermarks in the media based on the established time transition.

4. The system of claim 1, wherein the processor is to map the established time transition forward in the media by multiples of the second number of time units to determine one or more additional established time transitions.

5. The system of claim 1, wherein the processor is to map the established time transition backward in the media by multiples of the second number of time units to determine one or more additional established time transitions.

6. The system of claim 1, wherein the time unit is about five seconds.

7. A system comprising:
a watermark detector to detect watermarks in media;
a decoder to decode timestamps from respective ones of the watermarks; and
a timestamp transition resolution enhancer to:
identify a first transition window between a first watermark detected in media and a second watermark detected in the media;
calculate a first number of time units between the first watermark and the second watermark;
when the first number of time units is greater than a threshold,
set the first transition window as a first reference transition window, and
map the first reference transition window forward by a second number of time units;
identify a second transition window between the second watermark and a third watermark detected in the media;
calculate a third number of time units between the second watermark and the third watermark;
when the third number of time units is greater than the threshold,
calculate a fourth number of time units included in an overlap between the first reference transition window and the second transition window, and
when the fourth number of time units is less than or equal to the threshold,
set the overlap between the first reference transition window and the second transition window as an established time transition.

8. The system of claim 7, wherein the threshold is one time unit.

9. The system of claim 7, wherein the timestamp transition resolution enhancer is to identify a plurality of moments of transition between the watermarks in the media based on the established time transition.

10. The system of claim 7, wherein the timestamp transition resolution enhancer is to map the established time transition forward in the media by multiples of the second number of time units to determine one or more additional established time transitions.

11. The system of claim 7, wherein the timestamp transition resolution enhancer is to map the established time transition backward in the media by multiples of the second number of time units to determine one or more additional established time transitions.

12. The system of claim 7, wherein the time unit is about five seconds.

13. A non-transitory computer readable medium including instructions which, when executed, cause a machine to at least:
identify a first transition window between a first watermark detected in media and a second watermark detected in the media;
calculate a first number of time units between the first watermark and the second watermark;
when the first number of time units is greater than a threshold,
set the first transition window as a first reference transition window, and
map the first reference transition window forward by a second number of time units;
identify a second transition window between the second watermark and a third watermark detected in the media;
calculate a third number of time units between the second watermark and the third watermark;
when the third number of time units is greater than the threshold,
calculate a fourth number of time units included in an overlap between the first reference transition window and the second transition window, and
when the fourth number of time units is less than or equal to the threshold,
set the overlap between the first reference transition window and the second transition window as an established time transition.

14. The computer readable medium of claim 13, wherein the threshold is one time unit.

15. The computer readable medium of claim 13, wherein the instruction further cause the machine to identify a plurality of moments of transition between the watermarks in the media based on the established time transition.

16. The computer readable medium of claim 13, wherein the instruction further cause the machine to map the established time transition forward in the media by multiples of the second number of time units to determine one or more additional established time transitions.

17. The computer readable medium of claim 13, wherein the instruction further cause the machine to map the established time transition backward in the media by multiples of the second number of time units to determine one or more additional established time transitions.

18. The computer readable medium of claim 13, wherein the time unit is about five seconds.

* * * * *